US012601700B2

(12) United States Patent　　　(10) Patent No.:　US 12,601,700 B2

Jie et al.　　　(45) Date of Patent:　Apr. 14, 2026

(54) REAL-TIME MONITORING DEVICE AND METHOD FOR SURFACE SALT DEPOSITION AMOUNT

(71) Applicant: CHINA NATIONAL ELECTRIC APPARATUS RESEARCH INSTITUTE CO., LTD., Guangdong (CN)

(72) Inventors: Ganxin Jie, Guangdong (CN); Jun Wang, Guangdong (CN); Miaoran Liu, Guangdong (CN); Chuan Chen, Guangdong (CN); Li Xiang, Guangdong (CN); Haoran Liu, Guangdong (CN)

(73) Assignee: CHINA NATIONAL ELECTRIC APPARATUS RESEARCH INSTITUTE CO., LTD., Guangdong (CN)

( * ) Notice: Subject to any disclaimer, the term of this patent is extended or adjusted under 35 U.S.C. 154(b) by 169 days.

(21) Appl. No.: 18/597,841

(22) Filed: Mar. 6, 2024

(65) Prior Publication Data

US 2024/0210347 A1　　　Jun. 27, 2024

Related U.S. Application Data

(63) Continuation of application No. PCT/CN2021/131813, filed on Nov. 19, 2021.

(30) Foreign Application Priority Data

Sep. 14, 2021　(CN) .......................... 202111076152.6

(51) Int. Cl.
　*G01N 27/22*　　　(2006.01)

(52) U.S. Cl.
　CPC ......... *G01N 27/227* (2013.01); *G01N 27/228* (2013.01)

(58) Field of Classification Search
　CPC ..... G01N 27/227; G01N 27/228; G01N 27/02
　See application file for complete search history.

(56) References Cited

U.S. PATENT DOCUMENTS

| | | | | |
|---|---|---|---|---|
| 6,002,081 | A | * | 12/1999 | Sakuragi ................ H10N 10/13 |
| | | | | 136/203 |
| 2015/0268152 | A1 | * | 9/2015 | Friedersdorf .......... G01N 27/02 |
| | | | | 73/25.01 |
| 2015/0362381 | A1 | * | 12/2015 | Nagatomo ............. H01C 1/142 |
| | | | | 257/467 |

FOREIGN PATENT DOCUMENTS

| | | |
|---|---|---|
| CN | 2030723 | 1/1989 |
| CN | 106468651 | 3/2017 |

(Continued)

OTHER PUBLICATIONS

"International Search Report (Form PCT/ISA/210) of PCT/CN2021/131813," mailed on May 27, 2022, with English translation thereof, pp. 1-6.

*Primary Examiner* — Feba Pothen

(74) *Attorney, Agent, or Firm* — JCIP GLOBAL INC.

(57)　　　ABSTRACT

A real-time monitoring device for an amount of surface salt deposition comprises a host and a monitoring probe. The host generates a fixed frequency AC excitation signal and transmits it to the interdigital electrode inside the monitoring probe. And then the host analyzes a feedback signal to obtain an information of impedance value. The amount of salt deposition on the interdigital electrode surface is determined by a predetermined relationship curve between the amount of salt deposition and the impedance value, and the actual amount of salt deposition in the environment can be obtained. The monitoring device can change the relative (Continued)

humidity of the environment around the interdigital electrode by adjusting the temperature, so that the salt deposited on the surface of the interdigital electrode absorbs moisture and forms a liquid film, achieving real-time monitoring of the amount of salt deposition on the surface of the interdigital electrode.

9 Claims, 3 Drawing Sheets

(56)                     References Cited

FOREIGN PATENT DOCUMENTS

| | | |
|---|---|---|
| CN | 108226238 | 6/2018 |
| CN | 110426331 | 11/2019 |
| CN | 209961665 | 1/2020 |
| CN | 210108414 | 2/2020 |
| CN | 113030190 | 6/2021 |
| CN | 113075098 | 7/2021 |
| GB | 932335 | 7/1963 |

* cited by examiner

REAL-TIME MONITORING DEVICE AND METHOD FOR SURFACE SALT DEPOSITION AMOUNT

CROSS-REFERENCE TO RELATED APPLICATION

This application is a continuation of international application of PCT application serial no. PCT/CN2021/131813 filed on Nov. 19, 2021, which claims the priority benefit of China application no. 202111076152.6, filed on Sep. 14, 2021. The entirety of each of the above mentioned patent applications is hereby incorporated by reference herein and made a part of this specification.

BACKGROUND

Technical Field

This disclosure relates to the field of monitoring atmospheric environmental salt deposition, specifically to a real-time monitoring device and method for an amount of surface salt deposition.

Description of Related Art

Salt is a key factor causing corrosion of metal materials in the environment. After the salt in the environment deposits on the metal surface, the surface will absorb moisture and form a thin liquid film in a certain relative humidity environment, promoting the corrosion of the metal. Moreover, the amount of salt deposition is closely related to the corrosion rate. Therefore, monitoring the amount of surface salt deposition is crucial for understanding the corrosion rate of materials.

The traditional methods for measuring the amount of surface salt deposition are the dry plate method and the wet candle method. However, both of these methods for measuring salt deposition require manual operation in the measurement area, which takes a long time and is a complicated measurement process. In addition, the final measurement results obtained by the two methods are the average value of salt deposition over a period of time, which cannot achieve online real-time continuous monitoring.

SUMMARY

The first technical problem to be solved by the disclosure is to provide a real-time monitoring device for the amount of surface salt deposition that can achieve online real-time continuous monitoring.

The second technical problem to be solved by the disclosure is to provide a real-time monitoring method for the amount of surface salt deposition based on the aforementioned real-time monitoring device.

A real-time monitoring device and method for the amount of surface salt deposition of the disclosure can monitor the amount of salt deposition in the environment in real time, solving the problem of poor timeliness in obtaining results of existing measurement methods.

To solve the first technical problem mentioned above, the disclosure adopts the following technical solution.

A real-time monitoring device for the amount of surface salt deposition, comprising a host and a monitoring probe, wherein the host and the monitoring probe are electrically connected through a transmission wire; the monitoring probe comprises an interdigital electrode, a temperature and humidity sensor, an insulation shell, and a thermoelectric cooler; the interdigital electrode is installed inside the insulation shell, the temperature and humidity sensor is embedded in a middle of the interdigital electrode, and is located on the same plane as the interdigital electrode, the thermoelectric cooler is fixedly connected to a bottom of the insulation shell, and a radiator is installed below the thermoelectric cooler to reduce a temperature of a hot surface of the thermoelectric cooler; a fixed frequency AC excitation signal is generated by the host and transmitted to the interdigital electrode inside the monitoring probe, and the host analyzes a feedback signal of the interdigital electrode to obtain an information of impedance value.

Preferably, an inner wall of the insulation shell is equipped with a non-metallic thermal conductivity layer, which can ensure that condensation does not occur in the insulation shell while controlling the ambient temperature and relative humidity around the interdigital electrode.

Preferably, a layer of isolation plate is provided between the bottom of the insulation shell and the thermoelectric cooler. The isolation plate covers the thermoelectric cooler in an embedded way, filling peripheral gaps between the insulation shell and the thermoelectric cooler, separating a hot surface from a cold surface of the thermoelectric cooler, and improving the cooling efficiency.

Preferably, the surface of the interdigital electrode is covered with a layer of precious metal gold, and a deposited thickness of gold is not less than 1 $\mu$m, ensuring that the interdigital electrode can be used for a long time in the environment.

To solve the second technical problem mentioned above, the disclosure adopts the following technical solution.

A real-time monitoring method for the amount of surface salt deposition with the above-mentioned monitoring device, comprising the following steps:

1) deposit a specific amount of salt on a surface of the interdigital electrode of the monitoring probe, and place the monitoring probe in an environment with a relative humidity of a set value, so that the salt deposited on the surface of the interdigital electrode absorbs moisture and forms a liquid film;

2) control the host to generate the fixed frequency AC excitation signal and transmit it through a wire to the interdigital electrode; after receiving the fixed frequency AC excitation signal generated by the host, the interdigital electrode generates the feedback signal and transmits the feedback signal back to the host through the wire; the host analyzes the feedback signal of the interdigital electrode and obtains the impedance value of the liquid film on the surface of the interdigital electrode;

3) change the amount of salt deposited on the surface of the interdigital electrode and repeat the above steps to obtain the corresponding impedance values of the liquid film on the surface of the interdigital electrode under different amounts of salt deposition, then, draw a relationship curve between different amounts of salt deposition and impedance value at the relative humidity, and obtain a calculation relationship between the amounts of salt deposition and the impedance values;

4) put the monitoring device into the environment requiring monitoring, and the salt in the environment will deposit on the surface of the interdigital electrode; when it is necessary to measure the amount of salt deposition on the surface of the interdigital electrode, control the thermoelectric cooler with the host to change the temperature of the environment around the interdigital electrode, causing the relative humidity of the environment around the interdigital electrode to increase; and monitor the relative humidity of the environment around the interdigital electrode by the temperature and humidity sensor; when the relative humidity of the environment rises to a certain value, the salt on the surface of the interdigital electrode will absorb moisture and form a liquid film, then the host sends the fixed frequency AC excitation signal to measure the impedance value of the liquid film on the surface of the interdigital electrode; finally, according to the relationship curve between the amount of salt deposition and the impedance value drawn in step 3) and the measured impedance value of the liquid film on the surface of the interdigital electrode, the real-time amount of salt deposition on the surface of the interdigital electrode is obtained.

Furthermore, the relative humidity in the environment surrounding the interdigital electrode remains above 75%.

Furthermore, when the relative humidity in the environment around the interdigital electrode is lower than a hygroscopic point of salt, change the temperature of the environment around the interdigital electrode by adjusting a power of the thermoelectric cooler, thereby increasing the relative humidity in the environment.

Furthermore, a time interval for monitoring the amount of surface salt deposition should not be less than 30 min.

Furthermore, the main component of the deposited salt measured by the monitoring method is NaCl.

Furthermore, the amount of salt deposition obtained in the monitoring method is a content of $Cl^-$, and the amount of different types of salt deposition is calculated through the analysis of a composition of deposited salts.

Compared with the prior art, this disclosure has the following advantages.

This disclosure changes the relative humidity of the environment around the interdigital electrode by controlling the power of the thermoelectric cooler during each measurement, so that the salt deposited on the surface of the interdigital electrode absorbs moisture and forms a liquid film. Then, after analyzing the feedback signal from the interdigital electrode by the host, the information of impedance value of the interdigital electrode surface is obtained. Finally, the amount of actual salt deposition in the environment can be determined by determining the amount of salt deposition on the surface of the interdigital electrode through a predetermined relationship curve between the amount of salt deposition and the impedance value. Compared with existing measuring methods, this disclosed method has a simple operation process, effectively simplifies the measuring process, greatly shortens the measuring time, and when the relative humidity in the environment cannot reach the hygroscopic point of the salt, the relative humidity around the interdigital electrode can be changed by controlling the power of the thermoelectric cooler to reach the hygroscopic point of the salt, so that the deposited salt on the surface absorbs moisture and forms a liquid film, achieving online real-time continuous monitoring of the amount of salt deposition, ensuring the timeliness of measurement results.

In the figure: 1—host, 2—transmission wire, 3—monitoring probe, 4—data transmission interface, 5—power line, 6—cover plate, 7—interdigital electrode, 8—insulation shell, 9—non-metallic thermal conductivity layer, 10—isolation plate, 11—thermoelectric cooler, 12—radiator.

DESCRIPTION OF THE EMBODIMENTS

The following will provide a detailed explanation of the technical solution of the disclosure in conjunction with the accompanying figures and embodiments, in order for those skilled in the art to better understand and implement the technical solution of the disclosure.

Figure 1:
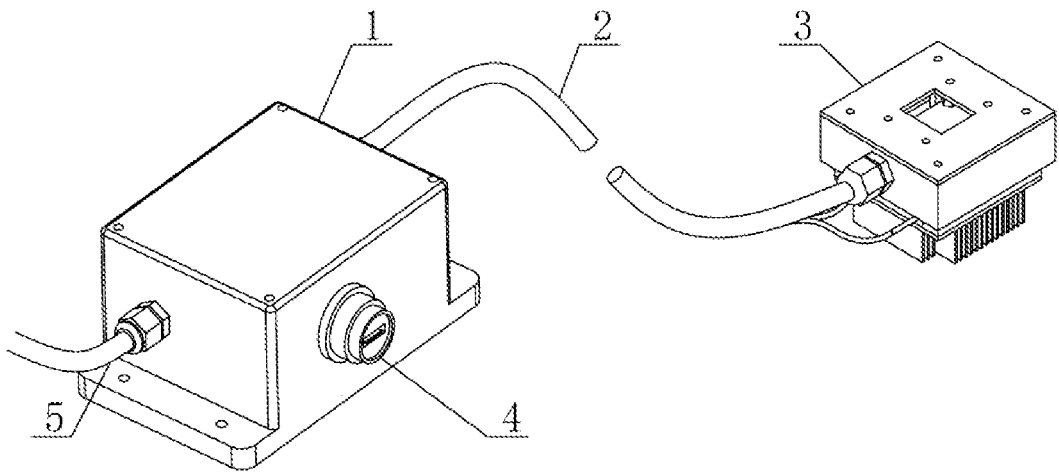
FIG. 1 is a three-dimensional schematic diagram of the overall structure of the disclosure.
Figure 2:
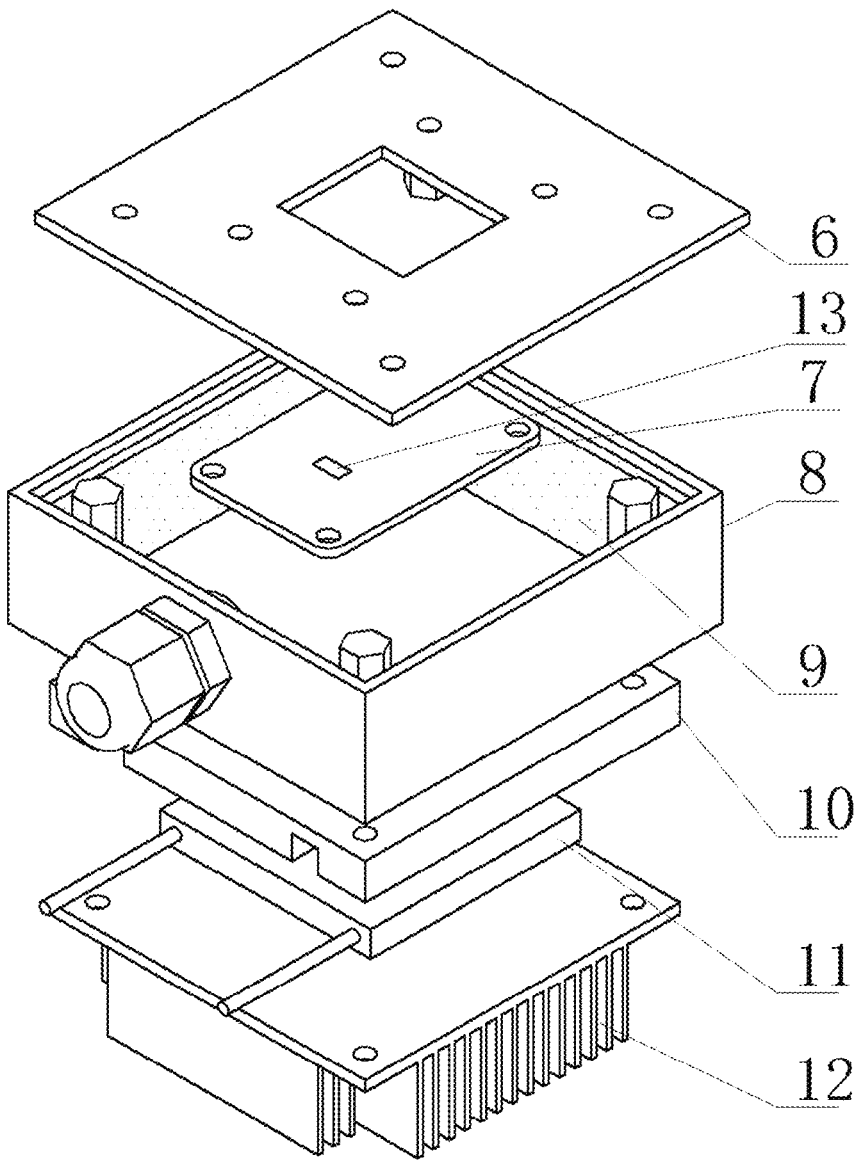
FIG. 2 is an exploded view of a monitoring probe in an embodiment of the disclosure.

The disclosure provides a real-time monitoring device for an amount of surface salt deposition as shown in FIGS. 1-2, comprising a host 1 and a monitoring probe 3. The host 1 and the monitoring probe 3 are electrically connected through a transmission wire 2.

The monitoring probe 3 includes an interdigital electrode 7, a temperature and humidity sensor 13, an insulation shell 8, and a thermoelectric cooler 11.

The interdigital electrode 7 can be selected from commercially available universal interdigital electrode sensors. The substrate of the interdigital electrode 7 is generally metallic copper, and a layer of precious metal gold is deposited on the surface of the copper substrate, which the thickness of the deposited gold is not less than 1 μm. The width of the interdigital and the distance between adjacent interdigital in the interdigital electrode can reach a minimum of 50 μm. This disclosure allows for the selection of a commercially available universal temperature and humidity sensor. The temperature and humidity sensor 13 is embedded in the middle of the interdigital electrode 7 and is located on the same plane as the surface of the interdigital electrode 7. The interdigital electrode 7 is installed inside the insulation shell 8. There is an opening in the middle of cover plate 6, the size of the opening is smaller than the size of the interdigital electrode 7, and the interdigital electrode 7 is installed directly below the opening. Covering the cover plate 6 on the insulation shell 8 can provide protection for the interdigital electrode 7, avoiding excessive exposure to the external environment and extending the service life of the interdigital electrode 7.

The thermoelectric cooler 11 is a commonly used thermoelectric cooler. The cold surface of the thermoelectric cooler 11 is fixedly connected to the bottom of the insulation shell 8, and the isolation plate 10 is added between the thermoelectric cooler 11 and the insulation shell 8. The isolation plate 10 covers the thermoelectric cooler 11 in an embedded way, filling the peripheral gap between the insulation shell 8 and the thermoelectric cooler 11, separating the hot surface of the thermoelectric cooler 11 from the cold surface, to improve the cooling efficiency. A radiator 12 is installed below the thermoelectric cooler 11 to reduce the temperature of the hot surface of the thermoelectric cooler 11.

There is also a non-metallic thermal conductivity layer 9 on the inner wall of the insulation shell 8, which can ensure that condensation does not occur in the insulation shell 8 while controlling the ambient temperature and relative humidity around the interdigital electrode 7.

In the disclosure, when monitoring the amount of salt deposition on the surface of the interdigital electrode 7, the relative humidity in the environment where the interdigital electrode 7 is located should be controlled at 75% or above to ensure that the deposited salt can absorb moisture on the surface of the interdigital electrode 7 and form a liquid film, so that the adjacent interdigital of the interdigital electrode 7 change from insulation to conductivity.

When the temperature and humidity sensor 13 detects that the relative humidity around the interdigital electrode 7 is lower than the hygroscopic point of salt, the power of the thermoelectric cooler 11 is adjusted by the host 1 to change the temperature of the environment around the interdigital electrode 7, thereby improving the relative humidity of the environment around the interdigital electrode 7 and achieving real-time monitoring of the amount of salt deposition on the surface of the interdigital electrode 7.

The principle of the monitoring device in this disclosure for monitoring the amount of salt deposition is that the salt deposited on the surface of the interdigital electrode will absorb moisture and form a liquid film in a high humidity environment, and the impedance values of the liquid film formed in a relative humidity environment are different for different amounts of salt deposition. Therefore, the amount of surface salt deposition can be obtained by determining the impedance value of the surface liquid film in a high humidity environment. During each measurement, the relative humidity of the surrounding environment of the interdigital electrode 7 is controlled by changing the power of the thermoelectric cooler 11, making the relative humidity of the environment reach the hygroscopic point of the salt, so that the deposited salt on the surface of the interdigital electrode 7 can absorb moisture and form a liquid film. Then, the host 1 generates a fixed frequency AC excitation signal, which is transmitted to the monitoring probe 3 through the transmission wire 2, and the feedback signal of the monitoring probe 3 is transmitted back to the host 1 through the connection wire 2. The host 1 then applies the fixed frequency small amplitude AC voltage signal to the interdigital electrode 7. After the voltage signal passes through the interdigital electrode 7, a current signal is obtained. The information of impedance value of the liquid film on the surface of the interdigital electrode 7 is obtained by the ratio of the voltage signal to the current signal. Finally, the amount of salt deposition on the surface of the interdigital electrode 7 is determined by the predetermined relationship curve between the amount of salt deposition and the impedance value, and the amount of actual salt deposition in the environment can be obtained.

There is a power line 5 for connecting external power sources and a data transmission interface 4 installed on host 1. The information of impedance value obtained after analysis by host 1 can be exported through wired data transmission or uploaded to the cloud server through wireless transmission methods such as GPS, and then downloaded from the cloud server.

The following will provide a detailed explanation of a real-time monitoring method for the amount of surface salt deposition based on the real-time monitoring device for the amount of surface salt deposition.

Embodiment 1

In this embodiment, the width of the interdigital and the distance between adjacent interdigital in the interdigital electrode are both 50 μm.

Figure 3:
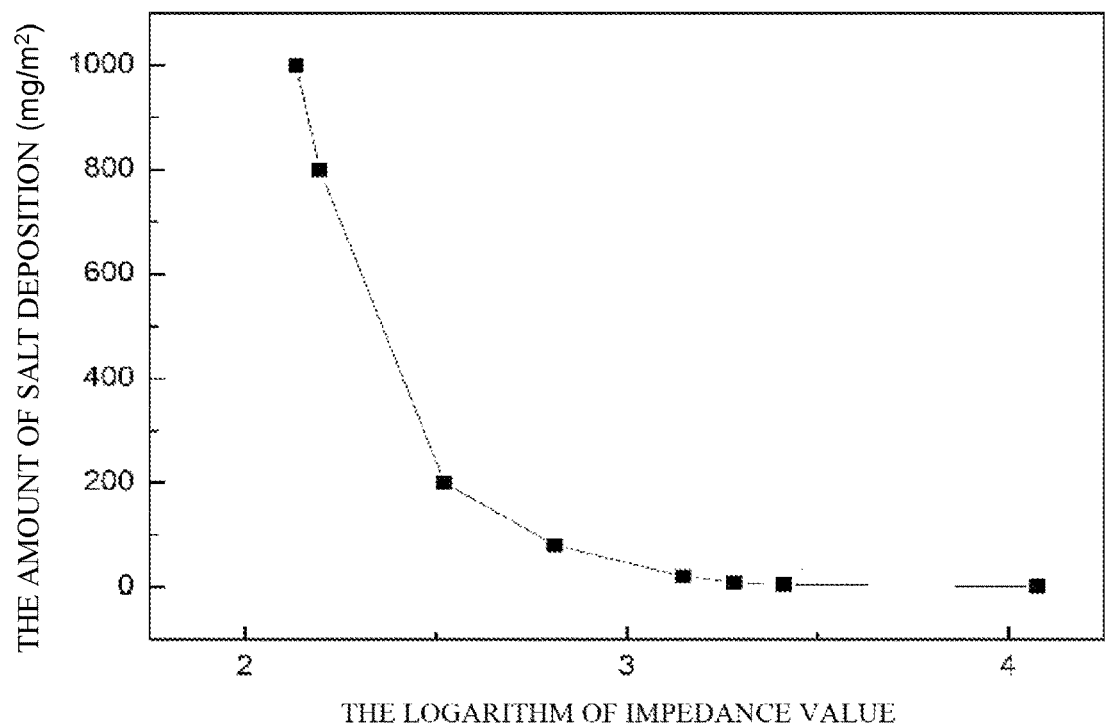
FIG. 3 shows the relationship curve between the amount of salt deposition and the logarithm of impedance value in Embodiment 1 of the disclosure.

In the first step, draw the relationship curve between the amount of salt deposition and the impedance value. Deposit 1 mg/m$^2$ of NaCl on the surface of the interdigital electrode 7 of monitoring probe 3, and put the probe in an environment with a relative humidity of 80%. After 10 min, the salt that deposits on the surface of the interdigital electrode 7 absorbs moisture and forms a liquid film. Then a fixed frequency AC excitation signal of 10 kHz is generated by the host 1 of the monitoring device and transmitted through the transmission wire 2 to the interdigital electrode 7 of the monitoring probe 3. Analyze the received feedback signal to obtain the impedance value of the liquid film on the surface of the interdigital electrode 7. Change the deposition amount of NaCl on the surface of interdigital electrode 7 of monitoring probe 3 to 4, 8, 20, 80, 200, 800, and 1000 mg/m$^2$, and measure the corresponding impedance value. Draw the relationship curve between different the amounts of salt deposition and the impedance values in an environment with a relative humidity of 80% using the measured data, as shown in FIG. 3. Fit the relationship curve to obtain the calculation formula for between the amount of salt deposition and the logarithm of impedance value, where y is Cl$^-$ deposition amount, in mg/m$^2$, and x is the logarithm of impedance value.

$$y = 0.0151 + 610.9253 * \exp - \left( \frac{x - 2.133}{0.24675} \right)$$

In the second step, place the monitoring device indoors in Guangzhou, Qionghai, Haikou, and Sanya for 30 days, and then retrieve the device. Increase the relative humidity of the surrounding environment of the interdigital electrode 7 by controlling the power of the thermoelectric cooler 11 while monitoring. When the relative humidity measured by the temperature and humidity sensor 13 stabilizes at around 80%, the impedance values of the liquid film on the surface of the interdigital electrode 7 are respectively 1563.2, 955.2, 1023.3, and 931.60 Ω/cm$^2$. According to the calculation formula of the amount of salt deposition and the logarithm of impedance value, the amounts of surface salt deposition are respectively 8.31, 19.74, 17.38, and 21.96 mg/m$^2$. At the same time, rinse the salt on the surface of the interdigital electrode 7 with deionized water, and then use UV spectrophotometry to measure the amount of Cl-ions in the deposited salt. The measurement results show that the deposition amounts are respectively 8.63, 18.91, 18.17, and 21.3 mg/m$^2$. By comparing the monitoring results of several regions, it can be concluded that the error between the monitoring results of the monitoring device and the measurement results using UV spectrophotometry is within 5%. This indicates that the results obtained by the monitoring device and method have high accuracy.

Embodiment 2

In this embodiment, the relationship between the amount of salt deposition and the measured impedance value in the first step is depicted in Embodiment 1.

Figure 4:
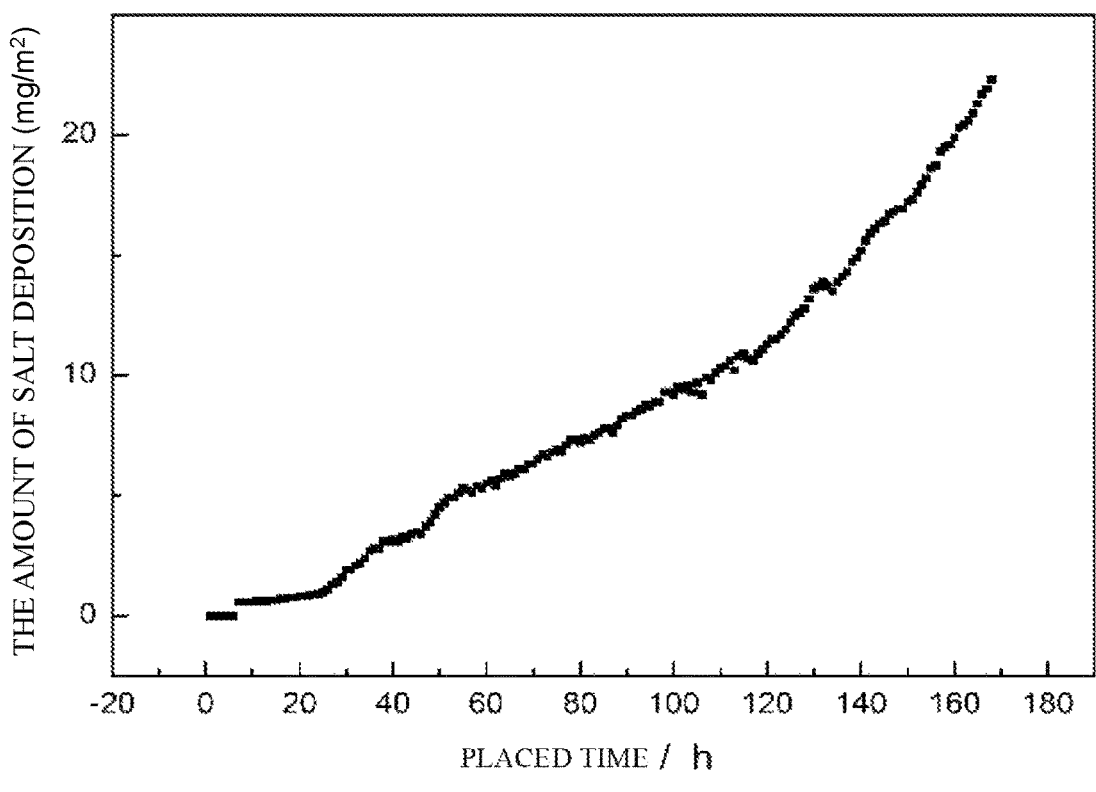
FIG. 4 shows the monitoring results of the monitoring device in Embodiment 2 of the disclosure after being placed in the marine atmospheric environment for 7 days.

In the second step, place the monitoring device in the marine atmospheric environment for 7 days for continuous measurement. The impedance value monitoring frequency of the device is 1 hour, and the power of the thermoelectric cooler 11 is controlled during the measurement. When the relative humidity measured by the temperature and humidity sensor 13 stabilizes at around 80%, measure the impedance value of the liquid film on the surface of the interdigital electrode 7. Based on the relationship curve between the amount of salt deposition and the impedance value, obtain the amount of surface salt deposition, and the final measured the amount of surface salt deposition is shown in FIG. 4.

In addition, if the device is to be used for a long time in an environment with high salt deposition, such as when the amount of salt deposition is greater than 1000 mg/m² in Embodiment 1 or a larger amount, a interdigital electrode sensor with a larger width between adjacent interdigital can be selected, such as a distance of 100 μm between adjacent interdigital, so that the range of the amount of salt deposition that can be measured will be greater. When the width between adjacent interdigital of the interdigital electrode is changed, the measured impedance value will change with the same amount of salt deposition. Therefore, it is only necessary to re-establish the relationship between the amount of salt deposition and the impedance value.

The above embodiments are only the preferred embodiments of the disclosure, but cannot be used as a limitation on the disclosure. Any modifications or improvements made based on the concept of the disclosure should fall within the scope of protection of the disclosure. The specific scope of protection shall be subject to the claims.

What is claimed is:

1. A real-time monitoring method for an amount of surface salt deposition with a real-time monitoring device, wherein the real-time monitoring device for the amount of surface salt deposition comprises a host and a monitoring probe, wherein the host and the monitoring probe are electrically connected through a transmission wire; the monitoring probe comprises an interdigital electrode, a temperature and humidity sensor, an insulation shell, and a thermoelectric cooler; the interdigital electrode is installed inside the insulation shell, the temperature and humidity sensor is embedded in a middle of the interdigital electrode, and is located on the same plane as the interdigital electrode, the thermoelectric cooler is fixedly connected to a bottom of the insulation shell, and a radiator is installed below the thermoelectric cooler to reduce a temperature of a hot surface of the thermoelectric cooler; a fixed frequency AC excitation signal is generated by the host and transmitted to the interdigital electrode inside the monitoring probe, and the host analyzes a feedback signal of the interdigital electrode to obtain an information of impedance value, wherein the real-time monitoring method comprises the following steps:

1) deposit a specific amount of salt on a surface of the interdigital electrode of the monitoring probe, and place the monitoring probe in an environment with a relative humidity of a set value, so that the salt deposited on the surface of the interdigital electrode absorbs moisture and forms a liquid film;

2) control the host to generate the fixed frequency AC excitation signal and transmit the fixed frequency AC excitation signal to the interdigital electrode; after receiving the fixed frequency AC excitation signal generated by the host, the interdigital electrode generates the feedback signal and transmits the feedback signal back to the host; the host analyzes the feedback signal of the interdigital electrode and obtains the impedance value of the liquid film on the surface of the interdigital electrode;

3) change the amount of salt deposited on the surface of the interdigital electrode and repeat the step 1) and the step 2) to obtain the corresponding impedance values of the liquid film on the surface of the interdigital electrode under different amounts of salt deposition, then, draw a relationship curve between different the amount of salt deposition and the impedance value at the relative humidity, and obtain a calculation relationship between the amounts of salt deposition and the impedance values;

4) placing the monitoring device into a monitoring environment and monitoring the salt deposited on the surface of the interdigital electrode; when measuring the amount of salt deposition on the surface of the interdigital electrode, control the thermoelectric cooler with the host to change a temperature of the environment around the interdigital electrode, causing the relative humidity of the environment around the interdigital electrode to increase; and monitor the relative humidity of the environment around the interdigital electrode by the temperature and humidity sensor; when the relative humidity of the environment rises to a set value, the salt on the surface of the interdigital electrode will absorb moisture and form a liquid film, then the host sends the fixed frequency AC excitation signal to measure the impedance value of the liquid film on the surface of the interdigital electrode; finally, according to the relationship curve between the amount of salt deposition and the impedance value drawn in step 3) and the measured impedance value of the liquid film on the surface of the interdigital electrode, the amount of real-time salt deposition on the surface of the interdigital electrode is obtained.

2. The real-time monitoring method for the amount of surface salt deposition according to claim 1, wherein the relative humidity set value in the environment surrounding the interdigital electrode remains above 75%.

3. The real-time monitoring method for the amount of surface salt deposition according to claim 1, wherein when the relative humidity in the environment around the interdigital electrode is lower than a hygroscopic point of salt, change the temperature of the environment around the interdigital electrode by adjusting a power of the thermoelectric cooler, thereby increasing the relative humidity in the environment.

4. The real-time monitoring method for the amount of surface salt deposition according to claim 1, wherein a time interval for monitoring the amount of surface salt deposition is not less than 30 min.

5. The real-time monitoring method for the amount of surface salt deposition according to claim 1, wherein a main component of the deposited salt measured by the monitoring method is NaCl.

6. The real-time monitoring method for the amount of surface salt deposition according to claim 5, wherein the amount of salt deposition obtained in the monitoring method is a content of Cl, and the amount of different types of salt deposition is calculated through the analysis of a composition of deposited salts.

7. The real-time monitoring method for the amount of surface salt deposition according to claim 1, wherein an inner wall of the insulation shell is equipped with a non-metallic thermal conductivity layer.

8. The real-time monitoring method for the amount of surface salt deposition according to claim 1, wherein a layer of isolation plate is provided between the bottom of the insulation shell and the thermoelectric cooler.

9. The real-time monitoring method for the amount of surface salt deposition according to claim 1, wherein a surface of the interdigital electrode is covered with a layer of gold, and a deposited thickness of gold is not less than 1 μm.

\* \* \* \* \*